United States Patent Office 3,134,017
Patented May 19, 1964

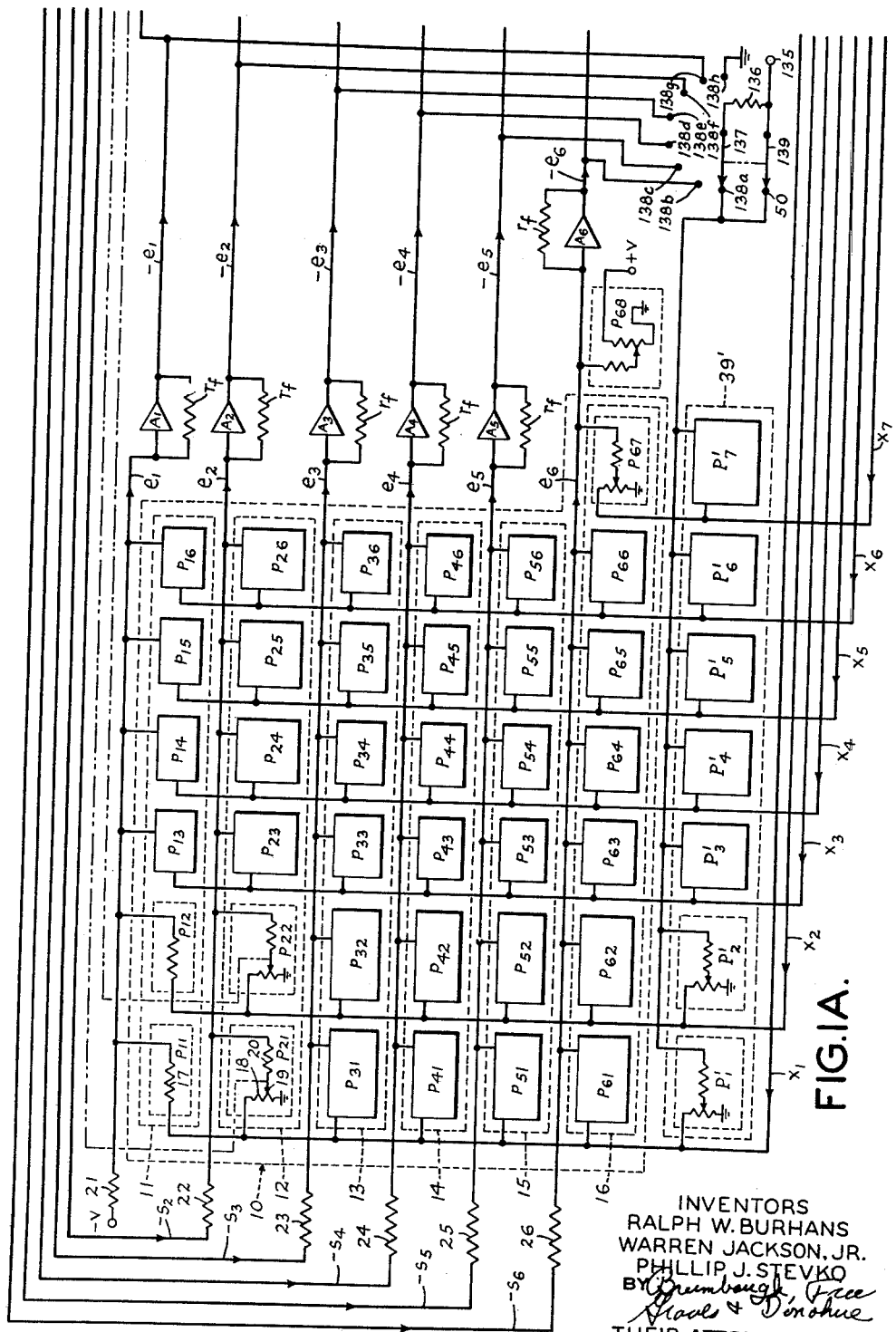
FIG.IA.
INVENTORS
RALPH W. BURHANS
WARREN JACKSON, JR.
PHILLIP J. STEVKO
BY
THEIR ATTORNEYS May 19, 1964  R. W. BURHANS ETAL  3,134,017
COMPUTING APPARATUS
Original Filed May 28, 1957  3 Sheets-Sheet 2
FIG.1B.
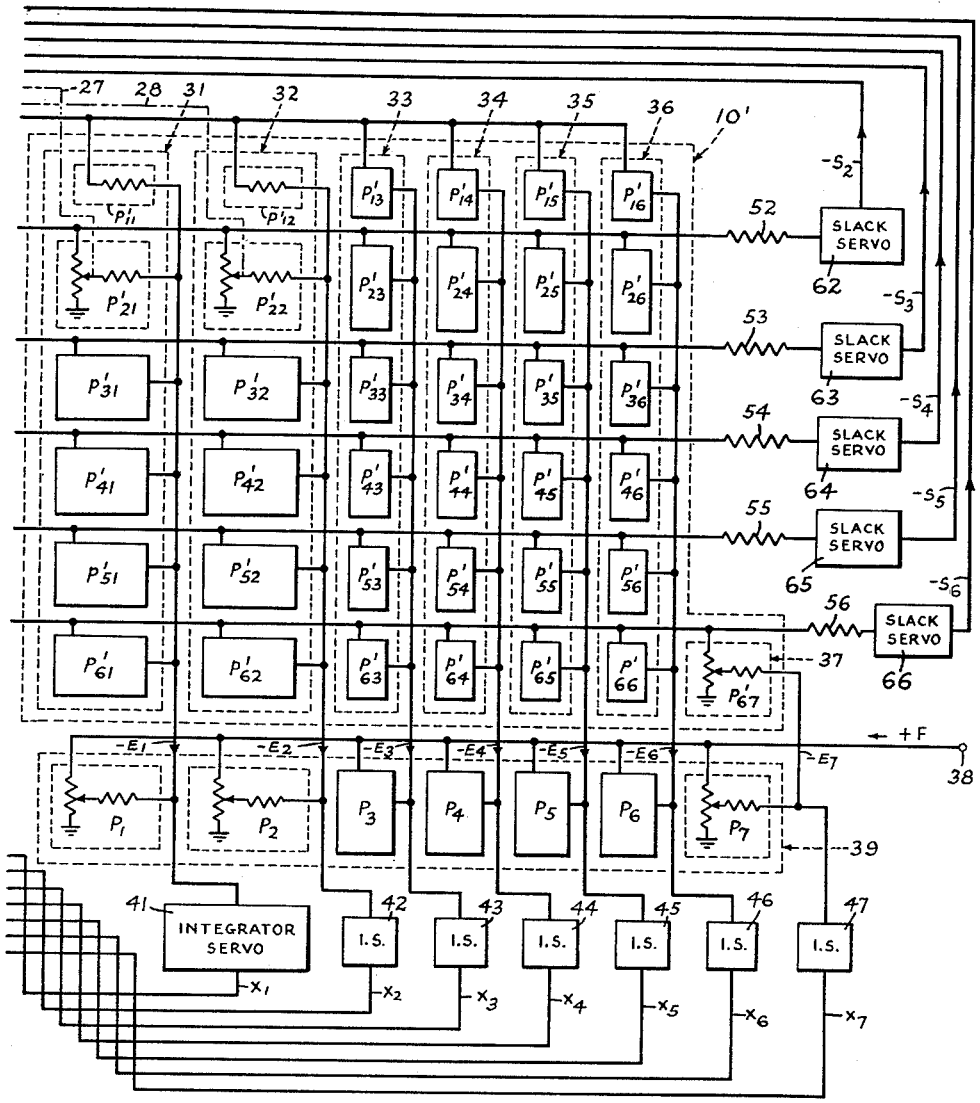
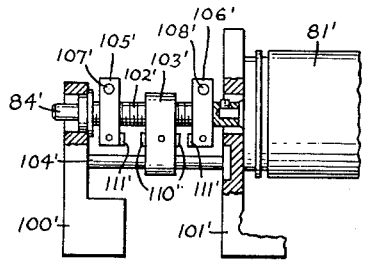
FIG.5.
INVENTORS
RALPH W. BURHANS
WARREN JACKSON, JR.
PHILLIP J. STEVKO
BY Brumbaugh, Free, Graves & Donohue
THEIR ATTORNEYS

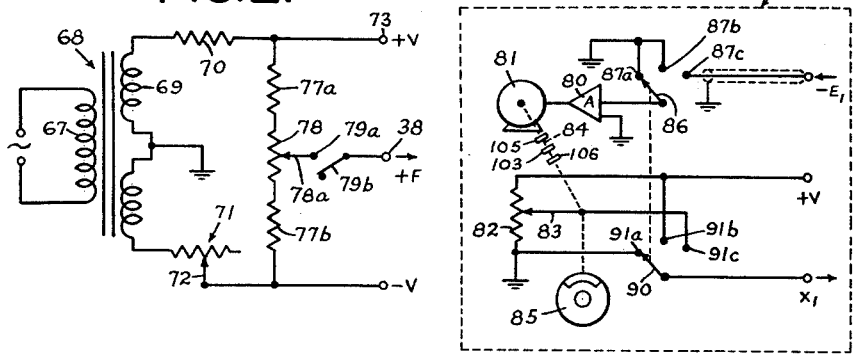
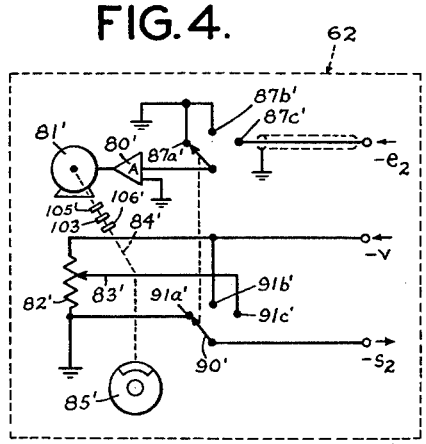
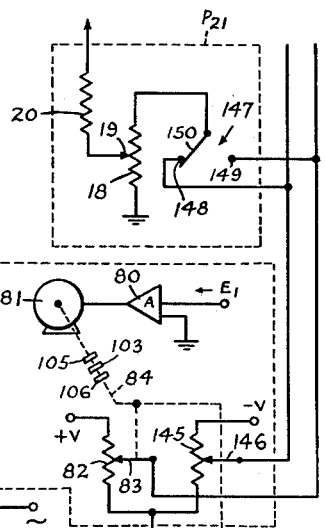
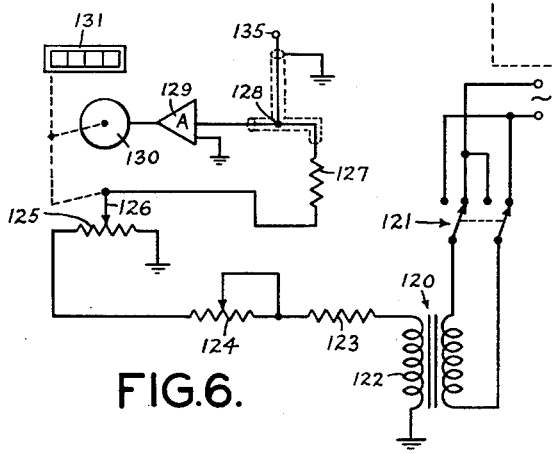
INVENTORS
RALPH W. BURHANS
WARREN JACKSON, JR.
PHILLIP J. STEVKO
THEIR ATTORNEYS

3,134,017
COMPUTING APPARATUS
Ralph W. Burhans, Chagrin Falls, Warren Jackson, Jr., Lyndhurst, and Phillip J. Stevko, Euclid, Ohio, assignors to The Standard Oil Company, Cleveland, Ohio, a corporation of Ohio
Original application May 28, 1957, Ser. No. 662,053, now Patent No. 3,048,335, dated Aug. 7, 1962. Divided and this application Oct. 5, 1961, Ser. No. 147,119
3 Claims. (Cl. 235—180)

This invention relates generally to analog computers, and more particularly to analog computers adapted to automatically converge to an optimal solution of an optimization problem.

This application is a division of our copending United States application Serial No. 662,053 filed may 28, 1957, now Patent No. 3,048,335.

An optimization problem may be described as a problem wherein $n$ variables are subject to a lesser number $m$ of restrictions, and wherein some or all of the $n$ variables appear in the terms of an expression for a criterion function whose value is to be minimized, maximized or otherwise optimized. A problem of this sort occurs, for example, in the blending of constituents to produce commercial gasoline.

To state the blending problem just referred to, gasoline which is acceptable for use, say, in automobiles may be formed by the blending together of a number of different refinery stocks and of a small amount of tetraethyl lead. It is self-evident that variable relative amounts of refinery stocks and tetraethyl lead may be used to form a blend, and that, hence, the relative amounts of the refinery stocks and of the tetraethyl lead are the variables of the problem.

It is known beforehand that the gasoline which is formed by this blending must meet certain predetermined minimum requirements with regard to such factors as octane number, percentage distillation over at given temperatures Reid vapor pressure, and, perhaps, other factors. These minimum requirements represent restrictions on the blending problem in that the choice of the composition for the blend is limited to a choice between those compositions wherein the amounts of the stocks and of the tetraethyl lead in a unit quantity of finished product are such as to cause the blend to satisfy the mentioned minimum requirements.

However, even with this imposed limitation on choice, there is usually a wide latitude left in the choice of the composition, since there are probably many different combinations of relative amounts of refinery stocks and of tetraethyl lead which, when blended, will yield a gasoline which satisfies the prescribed octane number and other prescribed requirements therefor. The question then becomes one of selecting, from all these possibly acceptable compositions for the blend, that particular composition which is the optimum composition in the sense that the cost of the blend is minimized. The essential problem of gasoline blending is, then, to determine which composition is the composition which meets all the prescribed requirements and is, at the same time, the least expensive composition.

In the quantification of optimization problems generally, it is ordinarily true that at least some of the restrictions of the problem will be represented by expressions which can be considered as independent simultaneous equations involving some of the variables of the problem. Assuming, for greater convenience of explanation, that the optimization problem which is presented is a very simple one, this problem might be represented by expressions as follows:

$$a_{11}x_1+a_{12}x_2+a_{13}x_3-S_1=0 \quad (1)$$
$$a_{21}x_1+a_{22}x_2+a_{23}x_3-S_2=0 \quad (2)$$
$$Z=c_1x_1+c_2x_2+c_3x_3 \quad (3)$$

Referring to the Expressions 1, 2 and 3 just given, the Expressions 1 and 2 are independent simultaneous equations representing the $m$ restrictions of the problem while the Expression 3 represents the criterion or "scoring" function of the problem. In Expressions 1 and 2 the quantities $a$ represent coefficients which may be either of positive value or negative value. In the present instance, for convenience, the coefficients $a$ are assumed to be constant value coefficients so that Expressions 1 and 2 are linear simultaneous equations. Similarly, in Expression 3 the quantities $c$ represent coefficients of positive or of negative value, and these coefficients $c$ are assumed, for convenience, to be of constant value. It is to be understood, however, that the invention hereof is applicable in instances where one or ones of the coefficients $a$ or $c$ are variable value coefficients and where, accordingly, the problem involved is a nonlinear problem rather than a linear programming problem.

In the three expressions given above, the quantities $x_1$, $x_2$ and $x_3$ represent the $n$ variables of the problem. Each of these variables is a positive value variable which may vary in value down to zero but which never goes negative. In the Expressions 1 and 2 the terms $S_1$ and $S_2$ may be of positive or negative value (or, occasionally, of zero value). These terms, as later described, may represent either a constant term or may represent a "slack variable." The meaning of the phrase "slack variable" is well known to the art, and is used herein to denote a quantity which may vary freely between one or two prescribed limits but which may not appear in the expression for the criterion function. In Expresion 3 the term $Z$ represents the criterion function whose value is to be optimized.

Further referring to Expressions 1, 2 and 3, it will be seen that since the three variables $x_1$, $x_2$ and $x_3$ are restricted by only the two independent linear simultaneous Equations 1 and 2, there are an infinite number of value sets $(x_1, x_2, x_3)$ which will satisfy these two simultaneous equations. Since each such value set represents a solution to the problem, it follows that the problem has an infinite number of solutions. At the same time, in an optimization problem of the sort described, one or some of all the possible solutions will better satisfy the problem than the rest of the solutions, or, in other words, will be in the nature of an optimal solution. The degree to which any solution is optimal is indicated by the criterion function $Z$ which serves, in accordance with the value assumed thereby for different value sets $(x_1, x_2, x_3)$ to evaluate or "score" these value sets for their approach to the optimum. Thus, for example, if it is required by the problem that $Z$ be minimized, and if it is assumed that the criterion function has only one minimum, the optimal solution for the problem is represented by that one of all the possible sets $(x_1, x_2, x_3)$ which causes the criterion function $Z$ to assume minimal value.

It is evident that the optimal solution for the problem represented by Expressions 1, 2, 3 could be found by a trial and error approach in which a large number of representative solutions $(x_1, x_2, x_3)$ for Equations 1 and 2 are first obtained, and in which all of the solutions so obtained are tried successively in Expression 3 to determine which solution is the optimal value for the criterion function Z. This trial and error technique becomes impracticably laborious, however, as the variables and the restrictions of the problem increase in number. In fact, in the case of the common optimization problem which includes, say, four or five or more variables and three or four or more restrictions, the trial and error technique is hardly feasible. Accordingly, if analog computers are to be of general application in solving optimization problems, it is necessary that the computer be characterized by the feature of automatic convergence to the optimal solution.

In a recent article "An Analogue Solution of Programming Problems" by Ablow and Brigham (Journal of the Operations Research Society of America, November 1955) and in another recent article "Linear Programming on an Electronic Analogue Computer" by Insley B. Pyne (Communication and Electronics, May 1956, published by the American Institute of Electrical Engineers) there have appeared proposals for an analog computer technique whereby automatic convergence to an optimal solution could be obtained for particular types of optimization problems. Taking the Pyne article as exemplary of the teachings of both articles, the automatic convergence technique which is proposed by Pyne is as follows.

Each of the restrictions of the problem is simulated by an electric signal channel which includes a D.C. operational amplifier connected to act as a summing amplifier. Thus, if there are a certain number of restrictions on the problem, there will be the same number of channels. Each of the channels responds to selected D.C. inputs, representing analog equivalents of ones of the variables of the problem, to produce as an output from its summing amplifier a D.C. signal which indicates at any time by its value whether or not the restriction simulated by the channel is satisfied at that time by the values of the inputs to the channel.

The outputs from the plurality of summing amplifiers are controlled by switching diodes so that each output is selectively applied or not applied to a translation circuit in dependence on whether or not the value of the output is an "allowed" value for the problem. Thus, the signals which are supplied to the translation circuit are signals which are discontinuous with time.

The translation circuit serves to convert the summing amplifier outputs, corresponding to the restrictions of the problem, into a plurality of signals corresponding to the variables of the problem. This is done in the translation circuit by obtaining electric signals which respectively represent the partial derivative of each restriction with respect to each variable of the problem which is included within the restriction, by segregating the partial derivative signals so obtained into separate groups corresponding to the several variables of the problem, and by then combining together all the partial derivative signals in each separate group thereof to thereby produce a plurality of resultant signals which respectively correspond to said groups and, hence, to said variables.

The resultant signals so obtained are supplied as outputs of the translation circuit to a plurality of D.C. operational amplifiers which are connected to act as integrators, and which respectively correspond to the variables of the problem. These last-named amplifiers integrate as a function of analog time the signals respectively supplied thereto to thereby produce respective outputs. These outputs of the integrating amplifiers are then supplied to the mentioned electric signal channels as the inputs thereto which represent the electric signal analogs of the variables of the problem. Thus, in effect, the analog computer system resembles a closed loop system.

To cause the system to converge to an optimal solution, a constant amount of a "forcing signal" is added at some point in the system to each of the signals which is the analog equivalent of a variable of the problem which is a determinator of the value of the criterion function. The value of forcing signal which is so added to any such analog signal is representative of the value of the partial derivative of the criterion function with respect to the variable corresponding to that analog signal. Thus, the several analog signals of the computer system which represent variables will be respectively modified in value in accordance with the values of the partial derivatives of the criterion function which respectively correspond to these variables. As explained by Pyne, when once an analog computer system of the sort described has been set up to simulate the problem and has thereafter been set into operation, the described modification of the mentioned analog signals will cause the computer in operation to automatically converge to an optimal solution. In dependence on the sign of the forcing signal, the computer may be forced to seek either a minimum solution or a maximum solution.

While the mathematical foundation of the Pyne technique is a sound one which can be used to verify that automatic convergence to an optimal solution will be produced by the operations of an analog computer system according to the present invention, analog computer systems of the type disclosed by Pyne are subject to a number of disadvantages of which some are as follows. First, it has been found in accordance with the invention, and for various reasons, that it is not necessarily desirable to have the outputs of the summing amplifiers applied discontinuously with time to points further on in the analog computer system. Second, a D.C. system is more costly and complex than is desirable, and, further, is subject to drift. Third, an analog computer system of the sort described requires a separate electric signal channel for each restriction on the problem, thereby unduly multiplying the number of channels which are used. Fourth, the system is incapable of dealing with an optimization problem involving slack variables without decreasing its capacity for handling primary variables. Fifth, an all-electronic system does not permit of the ease, reliability and accuracy of adjustment which is desirable in the setting of limiting values into the computer.

It is accordingly an object of the invention to provide an optimizing analog computer wherein automatic convergence may be obtained by a technique in which the outputs of the summing amplifiers are continuously applied to points further on in the computer.

Another object of the invention is to provide an optimizing analog computer which is free of the disadvantages accompanying the use of D.C. operated components.

Yet another object of the invention is to provide a computer of the sort described wherein the number of channels which is required may be reduced to less than the number of restrictions on the problem.

A further object of the invention is to provide an analog computer system suitable for solving optimizing problems involving slack variables.

A still further object of the invention is to provide an optimizing computer wherein limiting values may be easily and accurately set into the computer.

These and other objects are realized according to the invention by providing a plurality of first summing channels respectively corresponding to those restrictions of the problem which are represented by simultaneous equations, a plurality of second summing channels respectively corresponding to those variables of the problem which are other than slack variables, a source of forcing signal, a plurality of weighting means respectively corresponding to the ones of the said variables which appear in the criterion function, and a plurality of integrator means respectively corresponding to those variables of the problem which are other than slack variables. In operation, each of the first summing channels develops a simple error signal by responding to time-varying inputs of analog signals corresponding to the variables in the simultaneous equation represented by the channel. This simple error signal, during operation of the computer, provides a running measure of the extent to which the equation corresponding to the channel is unsatisfied by the values represented by the inputs to the channel.

The several simple error signals which are so produced by the first summing channels are applied continuously to the second summing channels. Each second summing channel responds to each simple error signal, whose value is in part determined by the analog signal for the variable corresponding to the second channel, to weight each such error signal in accordance with the relative value in the error signal of the last-named analog signal. After this weighting has taken place, the error signals received by each second summing channel are electrically superposed in this channel to provide an aggregate error signal as an output from the second channel. It follows that the several second summing channels will provide a plurality of aggregate error signals as the respective outputs thereof, and that these last-named error signals will respectively correspond to those variables of the problem which are other than slack variables.

For automatic convergence purposes, an amount of forcing signal is added to each aggregate error signal. This is done by electrically superposing a forcing signal derived from the mentioned source upon each aggregate error signal through a respective weighting means. Each such weighting means acts to scale the initial forcing signal from the source such that the amount of forcing signal which is impressed on any given aggregate error signal is in proportion to the weight in the criterion function of the variable which is associated with the aggregate error signal. As the analog computer in its operation progresses towards the optimal solution, the amplitude of the forcing signal provided by the source is progressively reduced. When a minimal solution is desired, the forcing signal is superposed with the aggregate error signals to reduce the absolute magnitude thereof. When a maximal solution is desired, the forcing signal is superposed with the aggregate error signals to increase the absolute magnitude thereof.

The aggregate error signals, when and as modified by the forcing signal, are supplied as inputs to the plurality of integrator means which correspond to those variables of the problem other than slack variables. These integrator means serve to integrate the inputs thereto as a function of analog time. The outputs of the integrator means are supplied to the first summing channels as the input signals thereto which are the analog equivalents of those variables of the problem other than slack variables.

An analog computer in accordance with the invention is operated to solve a particular optimization problem by preliminarily adjusting the first summing channels to simulate the simultaneous equations of the problem, by adjusting the second summing channels to give appropriate weight, as described, in each second channel to each output received thereby from a first summing channel, by adjusting the mentioned forcing signal weighting means to simulate the relative weight of the several variables in the criterion function, and by adjusting the source of forcing signal to provide an appropriate initial value for the forcing signal. At this time, the several integrator means may be set to each provide an output signal of zero value. Thereafter, the various components of the computer system are electrically energized. When once so energized, the computer will operate to progressively change the values of the signals developed therein in such manner that the individual signal values will automatically converge towards a condition of stability for the computer system as a whole. This automatic convergence towards stability corresponds to automatic convergence towards the optimal solution of the problem set up on the computer. As the computer tends towards stability, the amount of forcing signal is reduced. After a time, the computer system will reach stability, and at this time the optimal solution can be obtained by reading out the values of the output signals developed by the integrator means, and by interpreting the values of these output signals in terms of the values of the variables represented by the output signals.

As a feature according to the invention, the entire computer system may be formed of components which are operated by A.C. current. The use of such A.C. operated components permits a computer to be built at lower cost than if D.C. components were used. Also, A.C. operated components give more reliable operation than D.C. operated components, and are free of drift.

As another feature according to the invention, certain of the computer components may be components which are electromechanical in nature rather than purely electronic in nature. These electromechanical components will perform more reliably than all-electronic components. Moreover, some of these electromechanical components may include means for limiting the range of movement thereof to thereby introduce into the computer one or more restrictions which are in the nature of limit value restrictions. These limit value restrictions may be so introduced into the computer without providing an additional channel therein for each such restriction.

As yet another feature of the invention, additional components may be incorporated in the computer to simulate slack variables. These last-named components may be connected in the computer system in such manner that the number of channels thereof need not be increased.

For a better understanding of the invention, reference is made to the following description of representative embodiments thereof, and to the accompanying drawings wherein:

FIGS. 1A and 1B illustrate, partly in block diagram and partly in schematic diagram, an exemplary embodiment of an analog computer system according to the invention, when these two figures are placed in side-to-side relation with the leftward margin of FIG. 1B adjoining the rightward margin of FIG. 1A;

FIGS. 2-4, inclusive, and FIG. 6 illustrate in schematic diagram various of the components of the computer system of FIGS. 1A and 1B;

FIG. 5 illustrates a mechanical detail of the servo component shown in FIG. 3 or of the servo component shown in FIG. 4; and FIG. 7 illustrates how the computer system of FIGS. 1A and 1B may be modified to permit simulation thereby of coefficients of either positive sign or negative sign.

In connection with the figures listed above, it will be understood that any elements which are counterparts of each other are designated by the same primary reference symbol but by different suffixes for this primary reference symbol. Accordingly, it will be understood that, unless the context otherwise requires, any description hereinafter of an element with a given primary reference symbol and suffix is to be considered to apply also to any other element designated by the same primary reference symbol but by a different suffix.

Referring now to FIGS. 1A and 1B, the analog computer shown thereby is adapted to provide optimal solutions for gasoline blending problems wherein the variables of the problem may be the relative amounts of six refinery stocks and the relative amount of tetraethyl lead which should be blended together to provide gasoline meeting required specifications at minimum cost, and wherein there are six restrictions on the problem. The six stocks may be, for example: butane, light naphtha, catalytic distillate, catalytic reformate, polymer gasoline, and alkylate. The six restrictions may be: (1) the "material balance" restriction that the relative percentages of the refinery stocks used in the blending must add up to 100%, (2), (3) and (4), the relative percentages of the final blend which must have distilled over at distillation temperatures of 140° F., 257° F. and 356° F., respectively, (5) the Reid vapor pressure required for the final blend, and (6) the octane number of the final blend.

It is to be understood, of course, that the analog computer of FIGS. 1A and 1B may also be used to provide optimal solutions for gasoline blending and other problems involving a lesser number of variables and of restrictions than those just mentioned. Assuming, however, that the problem to be solved is the gasoline blending problem, just described, this problem can be quantified in terms of seven linear mathematical expressions. The first six of these expressions correspond to the restrictions (1) to (6) of the problem and these six expressions can be considered as independent simultaneous equations which relate the refinery stock and tetraethyl lead variables of the gasoline blending problem to the restrictions imposed on the final blend. The seventh expression relates the refinery stock and tetraethyl lead variables of the problem to the desired objective of the problem, namely, minimization of cost of the final blend, and is, hence, the expression for the criterion or "scoring" function. A more detailed understanding of the relationships established by these expressions will be obtained in the course of consideration of the circuits shown in FIGS. 1A and 1B.

Referring now to FIG. 1A, the number 10 designates an equation matrix of potentiometers. The matrix 10 is divided horizontally into six channels, 11–16, corresponding to the six restrictions. Each channel is comprised of a number of potentiometers, the channel 12, for example, being formed of potentiometers $p_{21}$–$p_{26}$, inclusive. In the case of channel 11, the elements thereof are, for purposes of symmetry, denoted "potentiometers," but, for the purpose of simulating the "material balance" restriction, actually take the form of simple resistors as shown. In each channel the several resistance elements thereof are each connected to supply an output to a common lead, and this lead is connected to a summing amplifier to supply the superposed outputs of the resistance elements of the channel to the input of the amplifier. Thus, as shown in FIG. 1A, the channels 11–16 respectively provide a plurality of net signals $e_1$–$e_6$ to the summing amplifiers $A_1$–$A_6$ corresponding to the channels. Each of the signals $e_1$–$e_6$ will hereinafter be referred to as a "simple error signal."

The equation matrix 10 may also be considered as being divided vertically into seven columns corresponding to seven signals $x_1$–$x_7$, which act as analog equivalents of the variables of the problem. Of these seven "$x$" signals, the signals $x_1$–$x_6$ are analog signals for the relative amounts of the six refinery stocks which may be used in the blending, while the signal $x_7$ represents the relative amount of tetraethyl lead. As shown in FIG. 1A, each "$x$" signal is supplied as an input to each of the potentiometers in the corresponding column in matrix 10. Thus, for example, the signal $x_1$ is supplied to each of the elements $p_{11}$–$p_{61}$ in the matrix.

Except for the potentiometers in channel 11 (which, as stated, may be simple resistors as exemplified by the resistor 17 representing "potentiometer" $p_{11}$), each of the potentiometers in matrix 10 is of identical construction. This construction is exemplfied by potentiometer $p_{21}$ which is comprised of a resistor 18 connected between the lead for signal $x_1$ and ground, a tap 19 slidable over resistor 18, and a summing resistor 20 connected between tap 19 and the common lead for channel 12 to the input of summing amplifier $A_2$.

The adjustment of the potentiometers in channel 12 is typical of the manner in which the considered gasoline blending problem is quantified and is set up on the analog computer system of FIGS. 1A and 1B. To explain this mode of adjustment, it will be recalled that channel 12 establishes the restriction that the blend to be produced must be sufficiently volatile that a given percentage of the blend will distill over at a distillation temperature of 140° F. Now, for purposes of determining how well a blend will meet this restriction, the blend can be considered as being made up of a percentage of each of the refinery stocks which represent six out of the seven variables of the problem. The seventh variable, relative amount of tetraethyl lead, can be excluded from consideration in connection with this particular restriction, since the percentage distillation over at 140° F. is not affected by the amount of lead which is present.

It will be evident that each of the six refinery stocks will have its own value for percentage distillation over at 140° F. It will also be evident that, for any admixture of the six stocks, the percentage distillation over at 140° F. of the final blend can be mathematically computed with reasonable accuracy by taking each stock in turn, for each such stock multiplying the value of percentage distillation over at 140° F. of that stock by the relative percentage of that stock in the mixture as a whole, the result being a figure representing the relative contribution of that particular stock to the percentage distillation over value characterizing the final blend, and by adding together the six figures so obtained.

Having computed in this manner what the actual value will probably be for the percentage distillation over at 140° F. for the final blend, it is necessary to determine whether this probable value will meet the restriction that the final blend must be of a preselected specified value in respect to distillation over at this temperature. This determination is made by simply comparing the computed probable value to the preselected specified value. The difference between the two values represents an "error" which must be reduced to zero if the final blend is to be a suitable one.

The above considerations can be conveniently expressed in mathematical form by the following expression:

$$a_{21}x_1 + a_{22}x_2 + a_{23}x_3 + a_{24}x_4 + a_{25}x_5 + a_{26}x_6 - S_2 = e_2 \to 0 \quad (4)$$

wherein the quantities "$x_1$–$x_6$" represent the relative amounts of the refinery stocks, the "$a$" quantities are coefficients representing the respective percentage values of these refinery stocks which will distill over at 140° F., and the quantity "$S_2$" represents the preselected specified value for percentage distillation over at 140° F. of the final blend. If the left-hand side of Expression 4 equals zero, then the mixture of stocks which is quantified by the expression is a mixture which satisfies the restriction of the problem that the percentage distillation over at 140° F. of the final blend must be equal to $S_2$. Conversely, if the left-hand side of expression 4 does not equal zero then the mixture of stocks which is quantified by the expression will not give a final blend meeting the restriction, but, instead, the final blend will be in error by the value given by the quantity $e_2$.

The correspondence between Expression 4 and channel 12 should be apparent. The channel 12 simulates expression 4 in that the input signals $x_1$–$x_6$ to the channel simulate the "$x$" quantities in the expression, and in that the potentiometers $p_{21}$–$p_{26}$ in the channel are individually adjusted to respectively attenuate the input signals $x_1$–$x_6$ in proportion to the values of the coefficients $a_{21}$–$a_{26}$ in the expression. The electrical signal corresponding to the quantity $S_2$ in the Expression 4 is introduced in channel 12 in a manner to be later described. The simple error signal $e_2$ which is the output of channel 12 obviously corresponds to the quantity $e_2$ in the expression. This error signal $e_2$ provides a running measure in accordance with its value of the degree to which the restriction associated with channel 12 remains unsatisfied as the analog computer in its operation progresses towards the optimal solution. At the optimal solution, the value of $e_2$ should be zero.

In connection with the above, it is to be noted that each of the "$a$" coefficients of Expression 4 must have a value less than 1 if the expression is to be exactly simulated on the computer. This is so, since the potentiometers in channel 12, being attenuators can, in effect, multiply their respective "$x$" signal inputs by a factor of one or less than one, but the potentiometers cannot multiply their signal inputs by a factor which is greater than one. However, all of the "a" coefficients in Expression 4 can easily be reduced to a value of less than one by scaling procedures well known to the art.

It is also to be noted in connection with Expression 4 and channel 12 that the "a" coefficients of Expression 4 are all positive value coefficients. This is so since only positive value coefficients are involved in the optimization problem of gasoline blending. It follows that the "p" potentiometers of channel 12 are, as shown in FIGS. 1A and 1B, adapted to simulate only positive values. As later described, however, these potentiometer units may be readily modified to selectively simulate either positive value or negative value coefficients.

Up to this point, the discussion has assumed that the restriction of the problem which is associated with channel 12 is a restriction requiring a fixed percentage value of the final blend to distill over at a temperature of 140° F. If this is the case, the quantity $S_2$ in Expression 4 will be a constant, and the corresponding analog signal which is introduced in channel 12 will be a constant value signal. In the actual practice of gasoline blending, however, it is usually the case that the amount of the blend which will distill over at 140° F. must be kept within a percentage range rather than to a fixed percentage value, and in this latter case the quantity $S_2$ in Expression 4 will represent a slack variable rather than a constant. As will be later described, the computer of FIGS. 1A and 1B is adapted to simulate quantity $S_2$ whether this quantity represents a constant or a slack variable.

The described channel 12 is typical of the other channels 13, 14 and 15 in the matrix 10. The channels 11 and 16 differ slightly from channel 12 in a manner which will now be described.

As stated, channel 11 is the channel which simulates the "material balance" restriction that the relative percentages of the refinery stocks used in making the blend must add up to 100%. A "material balance" restriction of this sort is represented by an expression as follows:

$$x_1+x_2+x_3+x_4+x_5+x_6-S_1=e_1 \to 0 \qquad (5)$$

wherein the quantities $x_1$–$x_6$ represent the relative amounts of the six refinery stocks in terms of fractions of a unit quantity of the final blend, and wherein the quantity $S_1$ represents a unit quantity of the final blend. In this Expression 5 it can be considered that each of the quantities $x_1$–$x_6$ is multiplied by a coefficient of value 1. It is evident, however, that the resistance units of channel 11 need not be potentiometer units in order to simulate these coefficients of value "1," but that, instead, these units may be comprised of simple isolating resistors which are exemplified by the resistor 17 in unit $p_{11}$. These resistors in channel 11 are alike in function and value to the isolating resistors in the rest of matrix 10. These last-named isolating resistors are exemplified by the resistor 20 in potentiometer unit $p_{21}$.

The constant $S_1$ in Expression 5 is simulated in channel 11 by connecting the common lead of this channel through an isolating resistor 21 to a source of negative reference voltage denoted —V. This source will be later described.

The channel 16 is the channel of the computer which simulates the restriction in the gasoline blending problem that the final blend must have a preselected value or range of values for the octane number thereof. This channel, like the other channels, includes six potentiometer units (i.e., the units $p_{61}$–$p_{66}$) corresponding to the analog signals $x_1$–$x_6$ for the relative amounts of the six refinery stocks which may be used in the blending. The channel 16, however, also includes a seventh potentiometer unit $p_{67}$ and an eighth potentiometer unit $p_{68}$ which is considered to be outside the matrix 10. Of these two last-named units, the potentiometer $p_{67}$ receives the analog signal $x_7$ representing relative amount of tetraethyl lead, while the potentiometer $p_{68}$ receives an input of +V volts from the source of positive reference voltage. These two extra potentiometers, which simulate the role of the lead in determining the octane number of the final blend, are present only in channel 16 for the reason that tetraethyl lead does not affect the other standard characteristics by which the blend will be evaluated as, say, percentage distillation over at a given temperature or Reid vapor pressure. The effect of the potentiometer $p_{68}$ is to introduce into the expression for the octane number of the final blend a constant term of positive value. The presence of this positive value constant may be explained as follows. If the octane number of the final blend is plotted against the relative amount of tetraethyl lead therein, the plot which results will be a curve which rises steeply from the axis for amount of tetraethyl lead but which gradually levels off thereafter. This nonlinear characteristic can best be simulated in the presently described computer by considering the curve of the characteristic to be approximated by a straight line which passes through two limiting points on the curve as, say, the points thereon corresponding to concentrations of 1.5 cc./gal. and 3 cc./gal. of tetraethyl lead in the blend. It is evident, however, that if such straight line approximation is to be used, a constant term must be introduced as a term of the equation of the straight line, since at the value 0 cc./gal. for tetraethyl lead, the straight line will intercept the axis for octane number at a point above the axis of the plot for amount of tetraethyl lead. It is this constant term in the equation for the straight line approximation of the octane number-tetraethyl lead curve which is introduced by the potentiometer $p_{68}$.

At this point it is to be noted that the computer of FIGS. 1A and 1B is operated by A.C. signals throughout. Thus, for example, the referred to —V and +V voltages are alternating voltages. Also, each of the analog signals $x_1$–$x_7$ is an alternating signal. The various voltages and signals of the computer may be either of 0° phase (reference phase) or of 180° phase (anti-reference phase). For convenience, however, in the description herein an alternating voltage or signal of 0° phase may be referred to as a positive (+) signal, and a voltage or signal of 180° phase may be referred to as a minus (—) signal. It is to be understood, however, that the terms "minus" and "plus" are generally used herein, in the description of the embodiment, to refer to the phase relations of an alternating voltage or signal rather than to refer to the level with respect to ground of a D.C. voltage or signal.

As stated, the channels 11–16 respectively produce the simple error signals $e_1$–$e_6$ which are applied to the inputs of the summing amplifiers $A_1$–$A_6$. These summing amplifiers are A.C. summing amplifiers which combine high gain with large negative feedback through the feedback resistors $r_f$ of the amplifiers to produce output signals whose amplitudes are proportional to the sum of the amplitudes in the corresponding channel of the individual output signals from the potentiometer units of the channel. It is characteristic of this type of amplifier that the output signal thereof will be proportional to but many times larger than the input signal which, ideally, is only incrementally above zero value. A.C. summing amplifiers of this sort are, per se, well known to the art, and are commercially available, for example, from the Feedback Control Corporation, 899 Main Street, Waltham, Massachusetts. The described A.C. summing amplifiers are preferable to D.C. summing amplifiers for use in analog computers for the reason that the A.C. type of amplifier is less expensive, simpler in construction, more accurate and freer of drift than is the D.C. type of amplifier.

The amplifiers $A_1$–$A_6$ produce respective outputs designated in FIG. 1A as $-e_1$ to $-e_6$. The output signals $-e_1$ to $-e_6$ are shown in FIG. 1A as being preceded by a minus sign (—) since the described type of summing amplifier characteristically produces an output signal whose sign (phase) is the reverse of that of the input signal.

The output signals $-e_1$ to $-e_6$ are applied to a transpose matrix 10′ of potentiometers. The potentiometers in this transpose matrix 10′ are identical in construction and arrangement with the correspondingly designated potentiometers in the equation matrix 10. Moreover, as a preliminary to operation of the computer, each potentiometer in transpose matrix 10' is adjusted to the same setting as that of the corresponding potentiometer in the equation matrix. This may be done by ganging together the corresponding potentiometers of the two matrices. For example, as shown in FIGS. 1A and 1B, the potentiometers $p_{21}$ and $p_{22}$ may be ganged through mechanical couplings 27 and 28 to, respectively, the potentiometers $p'_{21}$ and $p'_{22}$ in the matrix 10'. These mechanical couplings are symbolically represented in the drawings by dot-dash lines.

The transpose matrix 10' differs, however, from the equation matrix 10 in respect to the electrical connections of the matrix potentiometers and in respect to the function performed by the matrix. Considering, first, the potentiometer connections, the matrix 10' is not subdivided into six horizontal summing channels as is matrix 10, but, instead, is subdivided into seven vertical summing channels 31–37. Each of these summing channels corresponds to one of the seven analog signals $x_1$–$x_7$ of the computer, and, as will be seen, the potentiometer units forming each vertical summing channel in matrix 10' are those potentiometers which are the counterparts in matrix 10' of the potentiometers in matrix 10 which are fed by the analog signal associated with the vertical summing channel in matrix 10'. As an example of what is meant, the vertical channel 31 of matrix 10' is associated with the analog signal $x_1$. The potentiometers $p'_{11}$–$p'_{61}$ of this channel are the counterparts of the potentiometers $p_{11}$–$p_{61}$ in matrix 10. These last-named potentiometers are the potentiometers in matrix 10 which are fed by the analog signal $x_1$ which is associated with the channel 31 in matrix 10'.

Considering now the operation of the transpose matrix 10', in any vertical channel thereof each potentiometer of the channel serves to multiply the simple error signal from the corresponding horizontal channel of matrix 10 by the multiplying coefficient simulated in this horizontal channel for the "$x$" analog signal which is associated with the vertical channel. For example, adverting to Expression 4, it will be recalled that this expression is simulated by the channel 12, and that, further, the value of this whole expression is simulated by the error signal output $e_2$ from the channel 12. In this Expression 4 the first term is $a_{21}x_1$ and this first term is simulated in channel 12 by a setting of the potentiometer $p_{21}$ to represent the coefficient $a_{21}$, and by providing an input to potentiometer $p_{21}$ of an analog signal $x_1$ representing the quantity $x_1$ in the expression. As described, the potentiometer $p'_{21}$ will, as a preliminary to operation of the computer, be adjusted to the same setting as the potentiometer $p_{21}$, or, in other words, the potentiometer $p'_{21}$ will be adjusted to represent the coefficient $a_{21}$ just like the potentiometer $p_{21}$. The coefficient $a_{21}$ is, however, the coefficient which is the multiplier of the variable $x_1$ which, in turn, is the variable which is associated with the vertical channel 31 in which potentiometer $p'_{21}$ is located.

The significance of this multiplication through potentiometer $p'_{21}$ of the error signal $e_2$ by the equivalent of coefficient $a_{21}$ is as follows. In Expression 4 the value of each "$a$" coefficient is a tentative indication or measure of how much each "$x$" variable of the expression may be expected to contribute to its total value $e_2$. In other words, if all of the "$x$" variables of Expression 4 should happen to be of equal value, the relative contribution of each "$x$" variable to the total value $e_2$ would be in proportion to the value of the "$a$" coefficient which multiplies the variable. Hence, if all the "$x$" variables should happen to be of equal value, the product, for example, of the quantity $e_2$ and the coefficient $a_{21}$ would be a true measure of the relative contribution of the variable $x_1$ in Expression 4 to the total value $e_2$ for Expression 4.

Now, in the operation of the computer it is highly unlikely that all of the analog signals $x_1$–$x_7$ will ever be of equal value so as to simulate condition where all of the "$x$" variables of Expression 4 are equal, and it follows that the output of potentiometer $p'_{21}$, simulating the product of quantity $e_2$ and efficient $a_{21}$, is not, in fact, likely to be an exactly true measure of the actual relative contribution made by the $x_1$ signal input to channel 12 to the output signal $e_2$ of this channel. Nonetheless, the output of potentiometer $p'_{21}$ is significant in that it represents the assumed relative contribution of $x_1$ to $e_2$, the basis of the assumption being that all of the "$x$" analog signals to channel 12 are equal. It is on the assumption basis just described that the computer operates.

In like manner, the potentiometer $p'_{11}$ of channel 31 provides an output representing the assumed relative contribution of the analog signal $x_1$ to the output signal $e_1$ of channel 11, the potentiometer $p'_{31}$ of channel 31 provides an output representing the assumed relative contribution of the analog signal $x_1$ to the output signal $e_3$ of the channel 13, etc. The respective outputs of each of the potentiometers of the channel 31 are each supplied to a common vertical lead for the channel to provide an output signal $-E_1$ for the channel as a whole. This signal $-E_1$ will hereinafter be referred to as an aggregate error signal.

The significance of the aggregate error signal $-E_1$ is as follows. As stated, the output of potentiometer $p'_{21}$ represents the assumed relative contribution of the analog signal $x_1$ to the output signal $e_2$ from channel 12. This is the same as say that the output of potentiometer $p'_{21}$ represents, at any time in the operation of the computer, the assumed component developed by analog signal $x_1$ of the amount of error by which channel 12 in its operation fails to satisfy the restriction which is simulated by the channel. In like manner, the output of each other potentiometer in channel 31 represents the assumed component developed by analog signal $x_1$ of the amount of error by which the corresponding horizontal channel of matrix 10 fails to satisfy the restriction simulated by the channel. In this view, it will be seen that the aggregate error signal $-E_1$ can be considered as a measure of the assumed amount by which the analog signal $x_1$ itself departs at any time from that value thereof which will provide the optimal solution for the problem.

Altogether, the seven channels 31–37 will respectively develop seven aggregate error signals $-E_1$ to $-E_7$. Each of the signals $-E_1$ to $-E_6$ is produced by its associated channel in the same manner as the signal $-E_1$ is produced by channel 31. Also, each of the signals $-E_1$ to $-E_6$ will, like signal $-E_1$, be a measure of the assumed amount by which the associated "$x$" analog signal departs at any time from the value thereof which will provide the optimal solution for the problem. In connection with the signals $-E_1$ to $-E_7$, it is to be noted that these signals are of negative sign (180° phase). This is so, since the input signals $-e_1$ to $-e_6$ to transpose matrix 10' are of negative sign (180° phase).

In order to cause the computer operation to automatically converge to an optimal solution, an amount of forcing signal $+F$ is added to each of the output signals $-E_1$ to $-E_7$ of the transpose matrix 10'. This forcing signal is an A.C. signal which appears at a terminal 38 (FIG. 1B) and which is respectively combined with the signals $-E_1$ to $-E_7$ through seven potentiometers $P_1$–$P_7$ in a criterion function channel 39. As might be gathered, this channel 39 simulates the expression for the criterion function which is to be optimized. This expression may be of the following form:

$$c_1x_1 + c_2x_2 + c_3x_3 + c_4x_4 + c_5x_5 + c_6x_6 + c_7x_7 = Z \quad (6)$$

wherein, in this instance, the "$x$" quantities represent, as before, the relative amounts of the six refinery stocks and the tetraethyl lead in a unit quantity of the final blend, the "$c$" quantities represent the cost per unit quantity of the stocks and of the lead, and the term "$Z$" represents the cost per unit quantity of the final blend. The term "Z" is, of course, to be minimized.

The potentiometers $P_1$–$P_7$ in the channel 39 are adjusted to simulate the values of the "c" coefficients in Expression 6. The output of each potentiometer will accordingly simulate the product of the value of the forcing signal +F and of the "c" coefficient represented by this potentiometer. It will thus be seen that the outputs of the seven potentiometers $P_1$–$P_7$ will be relatively proportioned in accordance with the relative contributions of the six refinery stocks and the tetraethyl lead to the cost of the final blend if it be assumed that these constituents of the final blend are present therein in standard quantities. These outputs of the potentiometers $P_1$–$P_7$ are respectively applied to the aggregate error signals $E_1$–$E_7$ to modify the values thereof. It will be noted that the signals added from the channel 39 to the "E" signals are of opposite sign to the "E" signals which are negative. The forcing signal F and the "E" signals are of opposite sign in this manner to cause the computer to converge towards a minimal value for the criterion function rather than to a maximal value therefor.

After the aggregate error signals $-E_1$ to $-E_7$ have been modified by the forcing signal F, these aggregate error signals are respectively applied to the inputs of a plurality of A.C. operated integrator servos 41–47. The construction of these servos will be later described in more detail. For the time being it suffices to state that the "E" signals drive the integrator servos to produce respective outputs representing the integrals of the "E" signals as a function of analog time. These outputs of the servos 41–47 are applied to the equation matrix 10 as the analog signals $x_1$–$x_7$. It is to be noted that the integrator servos are phase-reversing devices in that the "E" signal inputs thereto are of negative sign (180° phase) whereas the "x" signal outputs therefrom are of positive sign (0° phase).

Referring to FIG. 1A, the analog signals $x_1$–$x_7$, besides being applied to the matrix 10, are also applied to the potentiometers $P'_1$–$P'_7$ of a channel 39' which, like the channel 39, simulates the criterion function given by Expression 5. The potentiometers of channel 39' are adjusted to the same settings as their counterpart potentiometers in the channel 39. This may be done by ganging together corresponding potentiometers in the two channels through mechanical couplings (represented by dot-dash lines) as shown in FIGS. 1A and 1B. The outputs of potentiometers $P'_1$–$P'_7$ are supplied to a common lead for channel 39'. This common lead is connected to the terminal 50 of a selector switch to be later described in more detail. It should be evident that, during the operation of the computer, the value of the voltage appearing on terminal 50 will provide a running measure of the value of the criterion function as the computer converges toward the optimal solution.

Returning to a consideration of Expression 4, it will be recalled that the term $-S_2$ appearing therein is a term which was previously stated to be simulated in channel 12 by the introduction into this channel of a signal representing the term. This signal is generated in the following manner. The output error signal $-e_2$ from the A.C. summing amplifier $A_2$ is applied through a summing resistor 52 to a slack servo unit 62. As later described in more detail, this servo unit comprises a motor which responds to the signal $-e_2$ to drive a potentiometer tap over a potentiometer resistor in the direction required by the input signal to the motor. The potentiometer resistor is energized by voltage of $-V$ value from the source of this negative reference voltage. The output of the servo is taken from the potentiometer tap. The range of movement of this tap over the potentiometer is restricted by two limit stops which may be set as desired to establish upper and lower limits for the tap movement.

In operation, the slack servo unit 62 produces an output signal $-s_2$ which, when the limit stops for the potentiometer are spread apart, cause the signal $-s_2$ to simulate a slack variable corresponding to the term $-S_2$ in Expression 4. This slack variable signal $-s_2$ is applied to the channel 12 through the summing resistor 22 (FIG. 1A). It is to be noted that the signal $-s_2$ is applied to the channel 12 with a negative sign and is, hence, opposite in sign to the positive value signals $x_1$–$x_6$ which are applied to this channel.

The servo unit 62 operates in the following manner. It may be assumed that, ordinarily, the signal $e_2$ generated by channel 12 at the start of the computer operation will be a signal of substantial positive value. This signal $e_2$ will cause the servo unit 62 to be driven in the direction of increase of magnitude of $-s_2$ signal to thereby cause signal $-s_2$ as applied with negative sign to channel 12 to decrease the output of signal $e_2$ from this channel. This drive of the servo unit 62 in the direction of increase of the magnitude of signal $-s_2$ continues until the movement of the potentiometer tap of the servo unit is halted by the upper limit stop.

Thereafter, the operation of the computer will continue, with the tap of the servo-unit potentiometer being held against the upper limit stop, until the values of the $x_1$–$x_6$ signals have been adjusted in the computer to bring the value of the $e_2$ output signal from channel 12 down to 0. At this point, it might be thought that all action in channel 12 would cease. In fact, however, the values of the $x_1$–$x_6$ signals which first bring the $e_2$ signal down to 0 may not be the values representing the optimal solution, since these values may not minimize the error output signals for one or more of the other channels of the equation matrix 10. Accordingly, the adjustment of the $x_1$–$x_6$ signals will continue in a manner seeking minimization of the error signals from the other channels. With respect to channel 12, however, the error signal $e_2$ will remain at 0 value during this further adjustment for the reason that, if there is any tendency of this error signal to depart from 0, the servo unit 62 will take up the slack to restore the signal $e_2$ to 0 by movement of the tap of the servo-unit potentiometer away from the upper limit stop. This taking up of the slack can continue until the potentiometer tap strikes its lower limit stop. If the tap once strikes its lower limit stop, the computer will take this fact into account in its operation such that the signals $x_1$–$x_6$ will be adjusted thereafter in a manner whereby the error signal $e_2$ from channel 12 will not go negative.

Up to this point, it has been assumed that the servo unit 62 is required to generate a signal $-s_2$ representing a term $-S_2$ which is a slack variable in Expression 4. It is evident, however, that, in case the term $-S_2$ represents a constant, this constant can be simulated by a signal $-s_2$ which is generated by the servo unit 62 when the limit stops of the tap of the servo unit potentiometer are placed to clamp the tap to one position on the servo-unit potentiometer.

In a manner alike to that by which servo unit 62 injects a signal $-s_2$ representing a slack variable or a constant term into channel 12, each of the channels 13–16 of the matrix 10 may have an "s" signal injected therein for the same simulation purposes. Thus, as shown in FIGS. 1A and 1B, the error signals $-e_3$ to $e_6$ of the amplifiers $A_3$–$A_6$ are applied through respective summing resistors 53–56 to the slack servo units 63–66 to cause these units to develop signals $-s_3$ to $-s_6$ which are injected back into the channels 13–16 through the summing resistors 23–26.

The necessity of establishing limiting values for the signals in the computer may arise not only in the case of the "s" signals representing slack variables, but as well in the case of one or more of the "x" signals. Thus, for example, in the gasoline blending problem it is usually required that the amount of tetraethyl lead present in a gallon of the final blend be greater than a minimum limit of 1.5 cc./gal. and be less than the maximum limit allowed by law of 3 cc./gal. It follows that the values which can be assumed by the $x_7$ signal, representing tetraethyl lead, should be restricted to a range of variation between two limiting values which simulate the mentioned limits of 1.5 cc./gal. and 3 cc./gal.

The establishment of limit values for the "$x$" signals can conveniently be done by the same technique as that employed for the "$s$" signals, namely, by the use of limit stops in the integrator servos 41–47 which generate the "$x$" signal.

The details of certain of the components of the computer will now be considered. Referring to FIG. 2, the primary winding 67 of a transformer 68 is excited by power from a 110 volt A.C. line. The secondary 69 of the transformer is grounded at its center and is connected at one end to a trimmer resistor 70 and at the other end to a trimmer potentiometer 71 having a tap 72. The supply for the computer of $+V$ reference voltage is taken from a terminal 73 connected to the trimmer resistor 70. The supply for the computer of $-V$ reference voltage is taken from the tap 72 of trimmer potentiometer 71. By adjusting tap 72 there may be obtained an accurate balance of the $+V$ and $-V$ reference voltages with respect to ground.

The forcing signal for the computer is obtained from the FIG. 2 circuit in the following manner. A resistor 77a, a potentiometer 78 having a tap 78a and a resistor 77b are connected in the order named in voltage dividing relation between the trimmer resistor 70 and the tap 72. The tap 78a is connected to the fixed contact 79a of a compute-stop switch having a movable contact 79b. The contact 79b is connected to the terminal 38 which is also shown in FIG. 1B. When the movable contact 79b is thrown to the "compute" or closed position with fixed contact 79a, the voltage appearing on terminal 38 will have an amplitude and phase dependent on the position of tap 78a on potentiometer resistor 78. If automatic convergence to a minimal solution is desired, the tap 78a is adjusted to give positive (0° phase) voltage on terminal 38. If convergence to a maximum is desired, the tap 78a is initially set to give a negative (180° phase) voltage on the mentioned terminal. In either case, as the computer converges towards the optimal solution the tap 78a is gradually moved in a manner causing the amplitude of the forcing signal voltage on terminal 38 to approach 0 value.

FIG. 3, while representing the details of the integrator servo 41 is also typical of the other integrator servos 42–47. As shown in FIG. 3, the integrator servo 41 comprises an A.C. servo amplifier 80 (commercially available from the Leeds and Northrup Corporation), an A.C. servo motor 81 which is energized from the servo amplifier, a potentiometer formed of a resistor 82 and a tap 83 which is driven over resistor 82 by a shaft 84 from the motor, and an indicating dial 85 which is also driven by this shaft to register the setting assumed by the servo. The input of the amplifier 80 is connected to the movable contact 86 in a first deck of a three-position switch having the fixed contacts 87a, 87b, 87c in this first deck. The first two of these fixed contacts are connected to ground while the other contact 87c is connected to receive the $-E_1$ signal from the transpose matrix 10' (FIG. 1B).

The resistor 82 of the potentiometer is, as shown, connected between the source of $+V$ reference voltage and ground. The output of $x_1$ analog signal from the integrator servo 41 is taken from a movable contact 90 in a second deck of the mentioned three position switch. This second deck includes the three fixed contacts 91a, 91b and 91c. As shown, contact 91a is connected to ground, contact 91b is connected to the supply of $+V$ voltage, and contact 91c is connected to the tap 83.

The shaft 84 of servo unit 41 is characterized by stop means establishing limits for the shaft rotation. These stop means will be discussed in connection with FIG. 5.

The three position switch of integrator servo 41 is in an "off" position when contacts 86 and 90 are thrown to the left. This "off" position is used before the computer is operated or is even set up with the problem to be solved. While the switch is in this "off" position, the servo 41 is adjusted to bring tap 83 to ground and to concurrently bring the dial 85 to a reading of 0.

The switch of servo 41 is adjusted to a "set" position when the contacts 86 and 90 are thrown to close with the contacts 87b and 91b, respectively. The significance of throwing the switch to this "set" position will be discussed in connection with FIG. 6.

The switch is at "run" position when the contacts 86 and 90 are thrown to the right to close with contacts 87c and 91c. When the switch is so thrown to "run" the $-E_1$ signal will be coupled to the input of servo amplifier 80, and the tap 83 will be coupled to supply $x_1$ analog signal to the equation matrix 10. The $-E_1$ signal is a small value signal relative to the signal capacity of the integrator servo 41. Under these conditions, it has been found that the $-E_1$ signal will excite the servo amplifier 80 to drive the servo motor 81 at a speed which is approximately proportional to the amplitude of the $-E_1$ signal. Such being the case, the motor 81 through shaft 84 will move tap 83 up from ground and over the resistor 82 in a manner causing the $x_1$ output signal from the tap to represent the integral with respect to analog time of the $-E_1$ input signal to the integrator servo. As the tap 83 so moves, the dial 85 will move ahead from its 0 value reading, and will continue to move until the computer has reached the optimal solution. When this solution has been reached, the movement of the dial will cease at a reading indicating the value of the $x_1$ signal which gives the optimal solution. Hence, by reading the dials of all the integrator servos 41–47, and by interpreting these readings in terms of the variables represented thereby, there may be obtained the set of values for the variables of the problem set up on the computer which will give the optimal solution for this problem.

FIG. 4 is a schematic diagram which, while representative of all of the slack servos 62–66 (FIG. 1B), shows in particular the details of the slack servo 62. As a comparison of FIGS. 3 and 4 will indicate, the arrangement for slack servo 62 is essentially the same as that for integrator servo 41 excepting that the potentiometer resistor 82' of the servo 62 is connected between ground and the source of $-V$ reference voltage rather than between ground and the source of $+V$ reference voltage as is connected potentiometer resistor 82' of servo 41. In view of this similarity between servo units 41 and 62, it is not necessary to describe the structure of the latter servo unit in detail.

FIG. 5 is a mechanical diagram illustrating how, as described, the movement of the slack servo 62 can be restricted to a range of movement between two adjustable limits to thereby restrict the amplitudes assumable by the signal $-s_2$ from the servo to a range of variation between upper and lower amplitude limits. As shown in FIG. 5, in the servo unit 62 the shaft 84' from the servo motor 81' is journaled in two spaced pedestals 100' and 101' between which there is a section of the shaft in the form of a worm 102'. This worm 102' carries in threaded relation a traveler nut 103' which is restrained from rotation by a horizontal rod 104' extending between the pedestals 100', 101' and passing in freely sliding relation through a hole (not shown) in the traveler nut. The worm 102' also carries in threaded relation to either side of the nut 103' a pair of limit blocks 105', 106'. In each of these blocks the upper part thereof is bifurcated by a slot (not shown) which extends from the top of the block to the aperture through which worm 102' passes, in a plane which includes the axis of the worm. In block 105' the spacing between the two sides of the slot in the block may be varied by loosening or tightening a clamping screw 107' which extends in threaded relation with the block from the part of the block on the near side of the slot, across the slot, and then into the part of the block on the far side of the slot. A similar clamping screw 108′ is present in the block 106′. This stop assembly is a modification of a type of stop assembly which is commercially available from the Reeves Instrument Company.

As shown in FIG. 5, the nut 103′ carries stop projections 110′ to either side thereof, and each of the blocks 105′, 106′ carries a stop projection 111′ adapted to engage with the matching stop projection of the traveler nut.

In the course of setting up the problem on the computer, the limits for the slack variable simulated by the servo unit 62 are established in the following manner. The clamping screws 107′, 108′ of the limit blocks 105′, 106′ are loosened to release these blocks from the worm 102′. Thereafter, the blocks may be moved translationally along the worm by rotating the blocks about the worm. The two blocks are so moved to respective translational positions on the worm which represent the two limits imposed on the slack variable simulated by the slack servo 62. The blocks are then clamped in position on the worm by tightening the clamping screws 107′, 108′.

In operation, the servo motor 81′ of the slack servo 62 is free to rotate its shaft 84′ as long as the rotations of the shaft stay within the range of angular displacement for which the traveler nut 103′ is not stopped by one of the clamped blocks 105′, 106′. If, however, the rotation of the shaft causes sufficient translational displacement through the worm 102′ of the nut 103′ to bring this nut into contact with one of the limit blocks, the servo motor 81′ will be restrained from further rotation in that direction which tends to advance the nut towards the contacted limit block. It follows that the movement of tap 83′ (FIG. 4) over resistor 82′ can be restricted to a range of movement between two preselectable limiting positions on the resistor, and that, accordingly, the amplitude of the $-s_2$ output signal from servo unit 62 can likewise be restricted to a range of variation between a preselectable lower amplitude limit and a preselectable upper amplitude limit.

In exactly the same way as that just described for servo unit 62, the shaft 84 of the integrator servo unit 41 (FIG. 3) can be provided with a traveler nut 103 and limit blocks 105, 106 to restrict the movement of servomotor 81 between two preselected limits to thereby restrict the amplitude variation of the $x_1$ output signal to a range between preselected lower and upper amplitude limits. Each of the slack servos 62–66 and each of the integrator servos 42–47 may have limits of variation introduced therein in a similar manner.

FIG. 6 is a schematic diagram of an arrangement which includes a precision servo, and which is utilized in the setting up of the problem on the computer. Referring to this figure, a transformer 120 may be connected to ordinary A.C. power lines through a two position switch 121 which, in dependence on its position, will produce A.C. voltage of either 0° phase or 180° phase in the secondary winding 122 of the transformer. One end of the secondary 122 is connected directly to ground, while the other end thereof is connected to ground through a voltage dividing network comprised of a fixed resistor 123, a variable resistor 124 and a potentiometer provided by a resistor 125 and a tap 126. The tap 126 is connected through a summing resistor 127 to a junction 128 which is connected to the input of an A.C. servo amplifier 129. The amplifier 129 energizes an A.C. servo motor 130 which drives both the tap 126 and a read dial 131 whose reading indicates the position of the tap 126 on the potentiometer resistor 125. The resistor 125 is a precision resistor.

The junction 128 is adapted to receive a voltage input from the analog channels of the computer through a terminal 135 which is also shown in FIG. 1A. Referring to this last-named figure, the terminal 135 is connected through a resistor 136 to a movable contact 137 in the first deck of an eight position selector switch. In this first deck, the eight positions of the switch correspond to eight fixed contacts 138a–138h. The terminal 135 is also connected to a movable contact 139 in a second deck of the selector switch. In this second deck, only the first position of the selector switch is an active position, the movable contact 139 closing in this first position with the fixed contact 50 which has heretofore been mentioned as receiving the output signal from the channel 39′.

Of the eight positions of the selector switch, the first position (all the way to the left) is used only for read-out after an optimal solution has been obtained by the computer, the second to sixth positions are used both for read-out and for setting up the problem on the computer, the seventh position is used for read-out, and the eighth position is an "off" position to which the switch is thrown when the computer is not operating.

The use of the eight position selector switch (FIG. 1A) and of the precision servo unit (FIG. 6) for setting up the computer will now be considered. When the time has come to set up the problem, the phase reversing switch 121 (FIG. 6) is thrown to the appropriate position to apply voltage of 0° phase to the precision resistor 125. Assume that it desired to adjust the potentiometer $p_{21}$ (FIG. 1A) to simulate the coefficient $a_{21}$ in Expression 4. To reach this end, the three position switch of the integrator servo 41 (FIG. 3) is thrown to the middle position to produce closure between movable contact 90 and fixed contact 91b to thereby place the $+V$ reference voltage on the lead (FIG. 1A) which normally supplies the $x_1$ analog signal to the potentiometer $p_{21}$. At the same time, the three position switches of all the other integrator servos are thrown to the left-hand, or "off," position. It follows that channel 12 will be energized only from the $p_{21}$ potentiometer, and that the $-e_2$ output signal from the summing amplifier $A_2$ of this channel will be a signal which is a measure of only the setting of the potentiometer $p_{21}$.

Having adjusted the integrator servo 41 as described, the eight position selector switch (FIG. 1A) is thrown to close the movable contact 137 with the fixed contact 138f to thereby couple the $-e_2$ output signal from amplifier $a_2$ to the junction 128 (FIG. 6) of the precision servo. Now the voltage appearing at junctions 128 will depend, first, upon the value of the $-e_2$ input signal, and, second, upon the setting of the tap 126 on the precision resistor 125. If, however, the voltage to ground at junction 128 is anything other than of 0 value, the amplifier 129 will respond to this voltage to energize servo motor 130 to drive the tap 126 over precision resistor 125 until the voltage at junction 128 has been reduced to 0. Upon this event, the servo motor 130 will stop, and the reading on dial 131 will be an indication of the value of the $-e_2$ input, and, hence, of the resistance value of the potentiometer $p_{21}$ at the particular setting which this potentiometer now has.

It follows, from what has been said, that as the potentiometer $p_{21}$ is adjusted by hand, the precision servo will follow these adjustments to indicate by the dial 131 the resistance value of each tentative setting of the potentiometer. Therefore, by observing the dial 131 while making the adjustment to the potentiometer $p_{21}$, it is possible to set this potentiometer exactly to that resistance value which is required to simulate the coefficient of the problem which is associated with the potentiometer. The advantage of setting the potentiometer $p_{21}$ in this manner is that, despite the fact that potentiometer $p_{21}$ may not itself be a precision unit, nevertheless this unit can be set with precision to a desired exact attenuation value because of the fact that the attenuation of potentiometer $p_{21}$ is continuously being compared during the setting thereof with the attenuation of the precision resistor 125 in the precision servo of FIG. 6.

In a manner alike to that just described, the precision servo may be used for the setting of each of the potentiometers $p_{31}$, $p_{41}$, $p_{51}$, and $p_{61}$ in the left-hand column of the equation matrix 10 by turning the eight position selector switch to cause the movable contact 137 to close respectively with fixed contacts 138e, 138d, 138c and 138b. The described procedure may be repeated to set in turn each other column of potentiometer units in the equation matrix 10. Each time a particular column of potentiometers to be set, the three position switch of the integrator servo corresponding to that column is turned to the middle, or "set," position while the three-position switches of the integrator servos corresponding to the other columns are maintained at the left-hand, or "off," position.

It will be understood that the precision setting of the potentiometers of equation matrix 10 through the use of the precision servo will be accompanied at the same time by a simultaneous precision setting of the potentiometers in the transpose matrix 10'. This simultaneousl precision setting of the potentiometers in the two matrices takes place by virtue of the ganging together, as described, of corresponding potentiometers in this two matrices. It will also be understood that by providing the first deck of the selector switch of FIG. 1A with additional fixed contacts on which are impressed, respectively, the signals $s_2$–$s_6$ from the slack servos, by closing the movable contact 137 of the selector switch with each of these additional contacts in turn, and by adjusting each slack servo (FIG. 4) in its turn to a condition wherein the three-position switch thereof is thrown to the middle, or "set" position, it is possible to employ the precision servo of FIG. 6 as an aid permitting precision setting of the limit blocks (FIG. 5) in each of the slack servos.

After the computer has been operated to automatically converge to the optimal solution, the precision servo can be used for various read-out purposes. Thus, if the eight-position selector switch (FIG. 1A) is thrown to the left-hand position so that movable contacts 137 and 139 respectively close with the fixed contacts 138a and 50, the precision servo will operate to provide an indication on the dial 131 of the value obtained for the criterion function at the optimal solution. Similarly, the contact 137 can be closed in turn with each of contacts 138b–138g to provide read-outs on dial 131 of the signals from the amplifiers $A_1$–$A_6$ which are respectively impressed on these last-named contacts. These signals should be of approximately 0 value if a true solution has been reached.

It will be recalled that it previously was stated that the potentiometers of the computer shown in FIGS. 1A and 1B were adapted to simulate only positive value coefficients. By a simple modification, however, these potentiometers may each be adapted to simulate either a positive value or a negative value coefficient. The manner in which this modification is carried out is illustrated in FIG. 7. As shown therein, to the integrator servo 41 of FIG. 3 there is added an additional potentiometer comprised of a resistor 145 and a tap 146 which is slidable over this resistor. The resistor 146 is connected between ground and the source of —V reference voltage, rather than between ground and the source of +V reference voltage as is the other resistor 82 of the integrator servo. The shaft 84 of the A.C. servo motor 81 is connected to drive the taps 83 and 146 in unison over their respective resistors 82 and 145.

By virtue of this modification the integrator servo 41 will provide an output of both a $+x_1$ analog signal and an output of a $-x_1$ analog signal. These two outputs are, in fact, supplied on separate leads to each of the potentiometer units in the left-hand vertical column of the matrix 10, but, for the sake of simplicity, are shown in FIG. 7 as being supplied only to the potentiometer unit $p_{21}$. This potentiometer unit as modified includes an individual two-position switch 147 having a pair of fixed contacts 148—149 which are respectively connected to the leads for $+x_1$ signal and $-x_1$ signal, and having a movable contact 150 which is connected to the end of resistor 19 away from the ground connection of this resistor. If movable contact 150 is thrown to close with fixed contact 149, the potentiometer unit $p_{21}$ is connected to simulate a positive value coefficient. Conversely, if contact 150 is thrown to close with contact 148, the potentiometer unit $p_{21}$ is connected to simulate a coefficient of negative value.

By modifying each of the integrator servos and each of the potentiometer units in the matrix 10 in the manner indicated by FIG. 7, the computer of FIGS. 1A and 1B may be made universally adaptable to solve optimization problems involving positive and/or negative coefficients. Moreover, by adding to the slack servos (FIG. 4) an additional potentiometer which is connected in a manner analogous to the potentiometer which is added to the integrator servos in the modification shown by FIG. 7, it is feasible to cause each slack servo to produce both a "+$s$" signal and a "—$s$" signal. A two-position switch may be used to selectively connect one or the other of these two "$s$" signals back into the channel of the equation matrix which is associated with the slack servo to thereby permit simulation in this channel of a constant or slack variable term which is either of positive value or of negative value.

Some typical circuit values for the disclosed computer are as follows:

The potentiometer resistor 18 and its counterpart potentiometer resistors in matrix 10 and matrix 10' (FIGS. 1A and 1B) may have a value of 100 kilo-ohms. The summing resistor 20 and its counterpart summing resistors in the two matrices may be 1 megohm, of 0.1% accuracy. All of the summing resistors 21 to 26 may, likewise, be 1 megohm, 0.1% resistors. Similarly, all of the summing resistors 52–56 may be 1 megohm, 0.1% resistors. The resistor 136 in the eight-position selector switch (FIG. 1A) and the resistor 127 in the precision servo unit (FIG. 5) may both be 1 megohm, 0.1% resistors. The precision resistor 125 in the precision servo unit may be a 15 turn, 1000 ohm resistor which is linear to 0.1%. The potentiometer resistors in the integrator servos (FIG. 3) and in the slack servos (FIG. 4) may be 10 turn, helical resistors of 100 ohm value, which are linear to 0.1%. The +V and —V voltages may each have a magnitude of 11 volts to ground.

A computer in accordance with the present invention is characterized by numerous advantages among which might be mentioned the following.

First, since the present computer does not require switching components for selectively applying or not applying input signals to the matrix 10' in dependence on whether or not the output signals on the matrix 10 are "allowed" values, the present computer permits of reduction of hardware, elimination of the time lags, transsients and nonlinearity which may be present when the switching technique is used, and greater flexibility of operation.

Second, it will be noted that the present computer has a mode of operation wherein the computer is able to converge to the optimal solution from a starting condition wherein all of the "$x$" analog signals are initially of zero value. This feature of being able to start from the "zero" condition simplifies both the setting up of the problem on the computer and the interpretation of the results obtained by the computer. Of course, if desired, the computer is also able to start the solution of a problem from a "non-zero" condition in those instances where the problem involves local minima, and where, accordingly, it is desirable to operate from a variety of starting conditions in order to determine which of the minima represents the true optimal solution.

Third, since the relative amount of forcing signal which may be used is not critical, and since this forcing signal need not have any particular quantitative relation to the other signals in the computer, the setting up of the computer for operation is simplified. Also, since, as the computer approaches the optimal solution the forcing signal may be (and is) reduced in magnitude down to a value which is just sufficient to prevent hunting in the computer system, the obtained optimal solution will be free from the error which would be present if the forcing signal had been kept to its initial value. By applying the forcing signal to the computer at points in the system which follow the summing amplifiers rather than being ahead of the same, the computer will be caused to converge to the optimal solution in a direct manner rather than in a series of step-by-step approximations corresponding to a succession of tentative optimal solutions produced by successive decreases in value of the forcing signal.

Fourth, by providing for the introduction of limit values in the manner described on the "$x$" signals which represent the prime variables of the problem, it is possible to simulate limit value restrictions of the problem in the computer without employing additional channels. This cannot be done with the computer arrangements which are taught by the prior art.

Fifth, as described, the computer is enabled to simulate variables of the problem which are slack variables rather than being prime variables in the problem. The prior art makes no provision for the simulation of slack variables having upper and lower limits, and the only provision made by the prior art for simulating quantities having one limit is through the described technique of selectively applying or not applying signals to the transpose matrix in dependence on whether these signals do or do not represent "allowed" values. As stated, this prior art "switching" technique is disadvantageous in many respects.

Sixth, a computer according to the present invention may, as described, utilize A.C. components with their accompanying advantages over D.C. components of greater simplicity, lower initial cost, lower cost of maintenance, greater accuracy and fredom from drift. As a further consideration, a computer according to the invention may, as set forth above, utilize electromechanical components which, among other advantages, permit the setting of values of the problem into the computer with much greater accuracy than would be possible with all-electronic components.

The above-described embodiments being exemplary only, it will be understood that the invention herein comprehends embodiments differing in form or in detail from the described embodiment. For example, as stated, the computer may be used to solve optimization problems which require maximizing rather than minimizing. Optimization towards a maximum may be obtained by simply using a sign (phase) for the forcing signal which is the reverse of that used in minimizing. As another example, the potentiometers of the computer need not be set by hand, but may, instead, be set by servos or similar devices which respond to electric signal inputs representing the coefficients or other factors of the optimizing problem to be solved. These signal inputs may be derived from devices which sense conditions extent in a process taking place to thereby permit use of the computer as a process controller. As another example, the integrator servos which are used may be of an improved type, as, say, the type of A.C. integrator servo, well known to the art, which employs a tachometer generator which is driven by the servomotor to generate a signal which varies with the motor speed, and which is combined with the input signal to the servo so that the motor speed is controlled by the difference between the voltage values of the two signals. Accordingly, the invention herein is not to be considered as limited save as is consonant with the scope of the following claims.

We claim:

1. In an analog computer adapted to automatically converge to an optimal solution for a problem having a number of variables and a lesser number of restrictions, and wherein a transpose matrix of potentiometers responds to signals from an equation matrix of potentiometers to develop at least one aggregate error signal corresponding to one of the variables of the problem, the improvement comprising, means to integrate said aggregate error signal as a function of analog time to provide an electrical output which is an analog signal simulating said variable and which is supplied from said integrator means as an input to said equation matrix and adjustable signal limiting means adapted to cooperate with said integrator means to limit the variation in value of said analog signal to a range of variations extending to one side of a pre-selected limit value determined by adjustment of said limiting means.

2. In an A.C. operated analog computer adapted to automatically converge to an optimal solution for a problem having a number of variables and a lesser number of restrictions, and wherein a transpose matrix of potentiometer responds to A.C. signals from an equation matrix of potentiometers to develop at least one aggregate error signal corresponding to a variable of the problem, the improvement comprising, an A.C. operated electromechanical integrator servo unit which includes a servo motor, a shaft driven thereby, a potentiometer winding and a tap drivable by said shaft over said winding, said motor being responsive to said aggregate error signal to rotate said shaft at a speed which varies with said aggregate error signal so as to drive said tap over said winding to produce at said tap an electrical output which varies with the angular displacement of said shaft, said output being supplied as an analog signal simulating said variable to said equation matrix, and adjustable mechanical stop means adapted to cooperate with said shaft to limit the angular displacement thereof to a range of displacements between lower and upper preselected mechanical limits which are each adjustable to restrict the travel over said winding of said tap as driven by said shaft to an amount less than the range of full travel over said winding which is permitted said tap in the absence of said stop means, said stop means thereby limiting the variations of said analog signal to a range of variations between corresponding lower and upper electrical limits for said analog signal.

3. In an A.C. operated analog computer adapted to automatically converge to an optimal solution for a problem having a number of variables and a lesser number of restrictions, and wherein a transpose matrix of potentiometers responds to A.C. signals from an equation matrix of potentiometers to develop at least one aggregate error signal corresponding to a variable of the problem, the improvement comprising, an A.C. operated electromechanical integrator servo unit which includes a servo motor, a shaft driven thereby, a potentiometer winding, and a tap drivable by said shaft over said winding, said motor being responsive to said aggregate error signal to rotate said shaft at a speed which varies with said aggregate error signal so as to drive said tap over said winding to produce at said tap an electrical output which varies with the angular displacement of said shaft, said output being supplied as an analog signal simulating said variable to said equation matrix, and adjustable mechanical stop means adapted to cooperate with said shaft to limit the angular displacement thereof to a range on one side only of a limit established by said stop means, said limit being adjustable to restrict the travel over said winding of said tap as driven by said shaft to an amount less than the range of full travel over said winding which is permitted said tap in the absence of said stop means.

References Cited in the file of this patent

UNITED STATES PATENTS 2,742,227   Bubb ------------------ Apr. 17, 1956

OTHER REFERENCES

Greenwood et al.: Electronic Instruments, McGraw-Hill, pages 403 and 404, 1948.